T. BEVINGTON.
CONVERTIBLE STOCK AND DUMP CAR.
APPLICATION FILED OCT. 3, 1910.
1,133,702.
Patented Mar. 30, 1915.
3 SHEETS—SHEET 1.
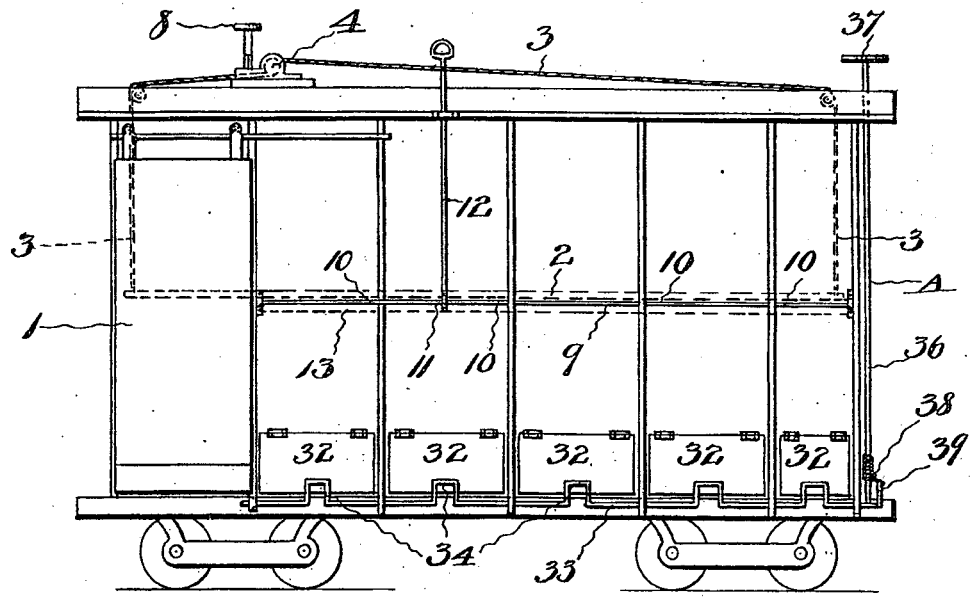
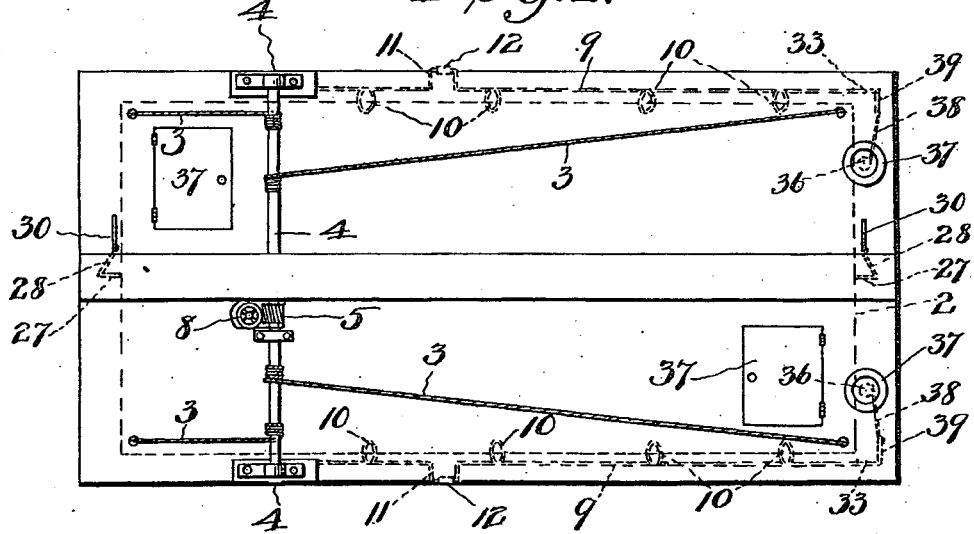

T. BEVINGTON.
CONVERTIBLE STOCK AND DUMP CAR.
APPLICATION FILED OCT. 3, 1910.
1,133,702.
Patented Mar. 30, 1915.
3 SHEETS—SHEET 2.
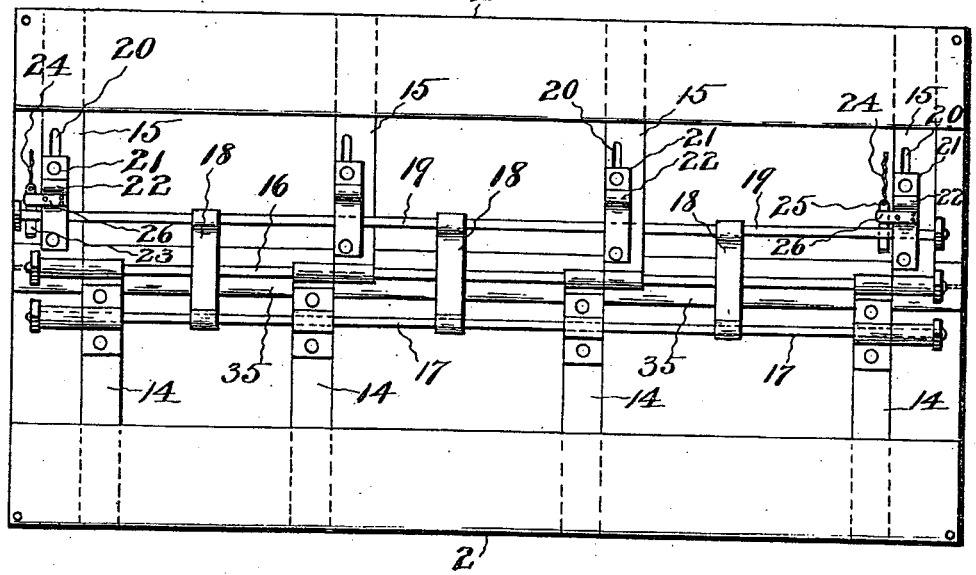
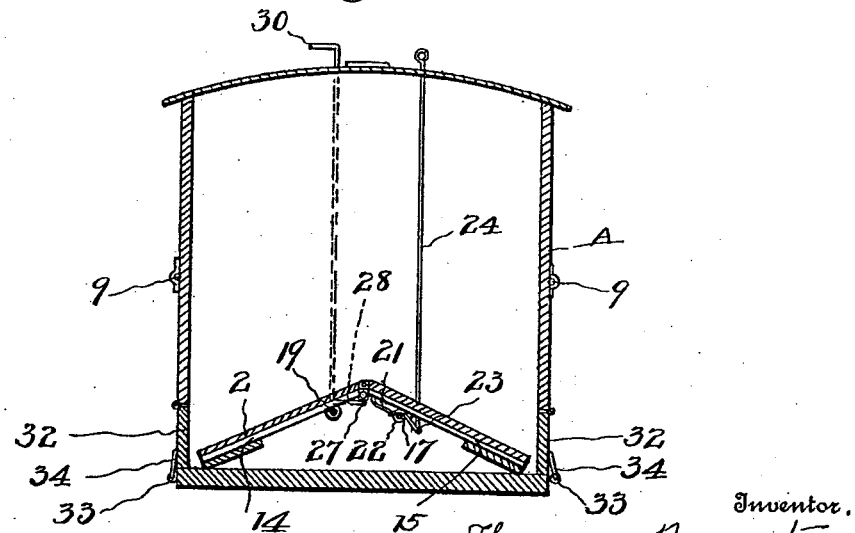

T. BEVINGTON.
CONVERTIBLE STOCK AND DUMP CAR.
APPLICATION FILED OCT. 3, 1910.

1,133,702.

Patented Mar. 30, 1915.
3 SHEETS—SHEET 3.

Witnesses
Jas. H. Blackwood
W. C. Blackwood

Inventor
Thomas Bevington
By James K. Polk
Attorney

UNITED STATES PATENT OFFICE.

THOMAS BEVINGTON, OF LINCOLN, NEBRASKA, ASSIGNOR OF ONE-HALF TO T. J. BROWNFIELD AND C. S. POLK, BOTH OF LINCOLN, NEBRASKA.

CONVERTIBLE STOCK AND DUMP CAR.

1,133,702. Specification of Letters Patent. Patented Mar. 30, 1915.

Application filed October 3, 1910. Serial No. 585,042.

*To all whom it may concern:*

Be it known that I, THOMAS BEVINGTON, a citizen of the United States, and a resident of Lincoln, in the county of Lancaster and State of Nebraska, have invented certain new and useful Improvements in Convertible Stock and Dump Cars, of which the following is a specification.

My invention relates to freight-cars for railroads, and has for its object the provision of a car that may be converted from a single-floor stock-car for hauling large stock, such as cattle and horses, to a double-deck car for hauling small stock, such as sheep and swine, and into a dump-car with side delivery inclined bottom.

Figure 7:
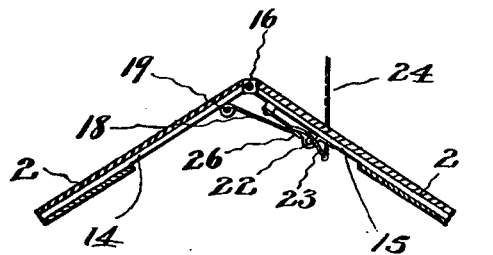
Figure 8:
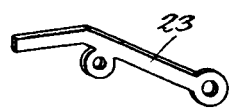
Figure 6:
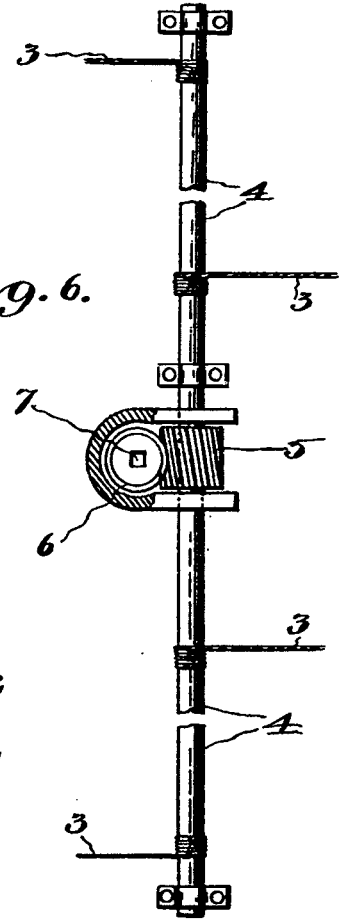
Figure 4:
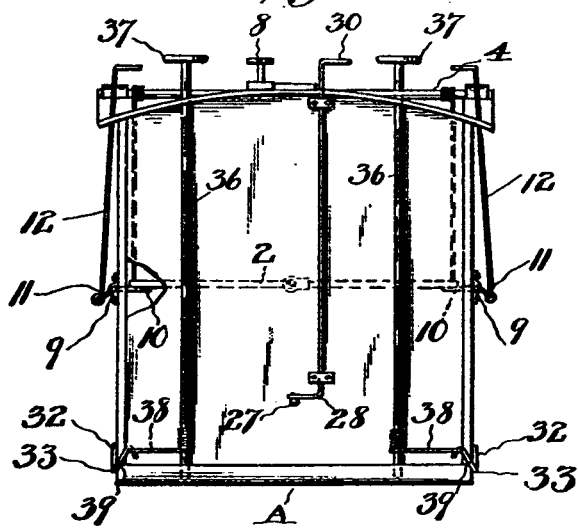

My invention will be described in detail hereinafter and illustrated in the accompanying drawings, in which—
Figure 1 is a side elevational view of a car constructed in accordance with an embodiment of my invention; Fig. 2 is a top plan view of the device as illustrated in Fig. 1; Fig. 3 is a transverse section taken through the body of the car and showing the floor or deck therein included adjusted in such position as to permit the device to be employed as a dumping car; Fig. 4 is an end elevational view of the device as disclosed in Fig. 1; Fig. 5 is a view in bottom plan of the floor or deck herein included; Fig. 6 is an enlarged detail view, partly in plan and partly in section, illustrating the means herein disclosed for operating the windlass; Fig. 7 is an enlarged detail sectional view taken transversely of the deck or floor as herein embodied and Fig. 8 is a view in perspective, detached, of one of the cross arms herein embodied.
In the drawings similar reference characters indicate corresponding parts throughout all of the views.

The car A is of the type known as "stock-cars," but instead of the doors 1 being in the middle of the sides, as is usually the construction, I provide the doors adjacent to the oposite ends of the two sides, so that in loading the animals will be compelled to go only in one direction after entering the car, and the confusion in loading will be thus avoided.

Another improvement that I have provided in my car is the provision of a movable floor or deck 2 that is secured to chains or cables 3 at its corners and run over pulleys or sheaves in the corners of the car and secured to windlass-roller 4, journaled on the car-roof.

5 indicates a worm-wheel secured to windlass 4, and 6 another worm-wheel suitably journaled and having a key-socket 7 therein to receive the stem of a suitable key 8 to rotate the windlass when it is desired to adjust the deck 2.

9 indicates a horizontal shaft journaled on each side of the car intermediate of the roof and floor and having hooks 10 extending therefrom to engage and support deck 2 when forming a double-deck car for small animals.

11 indicates a crank-arm on each shaft 9, and 12 a rod extending upwardly to the roof of the car to enable lifting the hooks when it is desired to lower the deck to the floor of the car for the purpose of making a dump-car of the car, as hereinafter described.

13 indicates a bar or beam located conveniently to each shaft 9 to engage hooks 10 when in position to support the deck 2.

When in the lowered position, shown in Fig. 3, deck 2 coöperates with the main floor of the car to form a double-deck car when small stock, such as sheep and swine, are to be carried, but when large stock is to be shipped the deck 2 is raised to the top of the car out of the way.

Another feature of my improved car is that it is capable of use as a dump-car, and to this end deck 2 is supported by cross-beams 14 and 15, pivotally secured together in the middle of the deck by means of a bar 16 running longitudinally of the deck.

17 indicates a rod secured to cross-beams 14 and having arms 18 pivotally secured thereto; and 19 a second rod disposed in parallelism with the rod 17 and secured to the free ends of arms 18. Cross-beams 15 are each formed with slotted openings 20, and 21 indicates plates secured to said cross-beams 15 through said slots 20 and provided with notches 22, said plates 21 being spaced apart to permit movement of the rod 19 between the plates and beams, said rod engaging the notches 22 when deck 2 is in the position shown in Figs. 3 and 7 to hold the two sides of the deck in relatively inclined positions to form inclined ways when the deck is in use as the bottom of a dump car. When the deck is in the extended position shown in Figs. 4 and 5, the rod 19 is seated between the plates 21 and cross-beams 15, and serve to prevent the deck sagging in the middle when subjected to a load of small live stock. Secured to the ends of rod 19 are cross-arms 23 and 25 that are secured to the rod intermediate of their ends, and 26 indicates lugs or projections secured to the plates 21 on the cross-beams 15 at the two ends of the deck and positioned to engage one of the ends of cross-arms 23 and 25.

24 indicates chains or other flexible members secured to the ends of the cross-arms 23 and 25, engaged by lugs 26.

When the deck 2 is in the angular position shown in Figs. 3 and 7, and it is desired to release it from said angular position to permit it to assume a flat position, the operator pulls upwardly on the chains 24, so that the cross-arms 23 and 25 act as levers with lugs 26 as fulcrums to lift the latch-rod 19 out of engagement with notches 22, and the weight of the middle of the deck causes it to assume a flat position when the ends 27 of the angular arms 28, hereinafter referred to, are moved from engagement therewith.

In operation the deck 2 is in a flat extended position when in use as an upper floor of the car, and when raised to the roof out of the way when the car is used to house large live stock or for ordinary freight, but should it be desired to haul granular material, such as coal, gravel, sand and the like, in bulk, the deck is lowered to the position shown in Fig. 4, the hinged part of the deck being engaged by the end 27 of an angular arm 28, projecting from the lower end of the vertical shaft 29, journaled on each end of the car, each shaft being manipulated from the roof of the car by means of a laterally-extending arm 30.

31 indicates holes in the ends of the car through which the ends 27 extend when the rod is turned.

It will be apparent that when the deck 2 is lowered, so that its hinged portion engages ends 27 of the angular arms 28, it will break in the middle and the two sides will incline downwardly, the rod 19 eventually coming to rest in the depressions 22 and forming a lock to hold the sides of the deck in their inclined positions, the ends 27 of the angular arms preventing sidewise movement of the deck.

32 indicates small doors along the two sides of the car, just above the floor, and hinged to their tops, as shown, that serve as dump-openings for the granular material, the inclined sides of the deck operating as chutes to move the material outwardly. The doors are held in a closed position by means of shaft 33, journaled under the lower edges of the doors, with arms 34 extending laterally therefrom that engage the doors and hold them closed.

36 indicates a vertical shaft at each end of the car, operated by a hand-wheel 37, and 38 a chain secured to the shaft 36 and to an arm 39 on the end of shaft 33 to rock said shaft 33 into position, so that its arms 34 engage the doors. In dumping the load the shafts 36 are rotated to unwind the chains 38 thereon, the weight of the material pressing against the doors causing them to open.

35 indicates a strip of leather, canvas, or other flexible material secured to one side of the deck 2 and extending over the hinged part to close the cracks between the two halves of the deck.

37 indicates trap-doors in the roof of the car that may be used to load it when used for hauling the granular substances referred to or when the car is used for a stock-car the trap-doors may be employed for feeding and watering the stock and for ventilation.

Having thus described my invention, what I claim is—

1. In a car, a vertically movable deck comprising hingedly connected sections, means to raise and lower said deck, means to hold the deck with its sections inclined, and doors in the sides of the car to dump its contents.

2. In a car, a vertically-movable deck comprising hingedly connected sections, means to raise and lower said deck, strips secured to one of the sections of the deck and having depressions therein, a rod engaging said strips and the depressions therein, a rod secured to the other section, links connecting said rods, and doors in the sides of the car to dump its contents.

In witness whereof, I have hereunto set my hand in presence of two subscribing witnesses.

THOMAS BEVINGTON.

Witnesses:
L. B. TAIT,
C. M. HERRICK.